(12) United States Patent
Larcom et al.

(10) Patent No.: US 8,585,125 B2
(45) Date of Patent: Nov. 19, 2013

(54) COVER FOR A TAILGATE ROD PASSAGE

(75) Inventors: Ryan V. Larcom, Greenwood, IN (US); Hiroaki Taniguchi, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 149 days.

(21) Appl. No.: 13/118,815

(22) Filed: May 31, 2011

(65) Prior Publication Data

US 2012/0306229 A1    Dec. 6, 2012

(51) Int. Cl.
*B60J 10/08*    (2006.01)
(52) U.S. Cl.
USPC ................... 296/146.9; 296/1.08; 74/566
(58) Field of Classification Search
USPC ............. 296/1.08, 50, 56, 57.1, 106, 146.5, 296/146.7, 146.8, 146.9, 152; 49/339–344; 74/566
See application file for complete search history.

(56) References Cited

U.S. PATENT DOCUMENTS

| | | | |
|---|---|---|---|
| 6,234,044 B1* | 5/2001 | Slon et al. | 74/566 |
| 2009/0250911 A1* | 10/2009 | Sia et al. | 280/728.3 |
| 2010/0007170 A1 | 1/2010 | Etou et al. | |
| 2010/0066120 A1 | 3/2010 | Etou et al. | |
| 2011/0309649 A1* | 12/2011 | Yamase et al. | 296/57.1 |

FOREIGN PATENT DOCUMENTS

| | | |
|---|---|---|
| JP | 2006-231970 | 9/2006 |
| JP | 2008214987 A * | 9/2008 |
| KR | 2009123223 A | 12/2009 |
| KR | 10-0942107 | 2/2010 |

* cited by examiner

*Primary Examiner* — Glenn Dayoan
*Assistant Examiner* — Jason S Daniels
(74) *Attorney, Agent, or Firm* — Fay Sharpe LLP

(57) ABSTRACT

A tailgate for an automotive vehicle. The tailgate is coupled via a rod to a motor within the automotive vehicle to open and close the tailgate. The tailgate comprises a metal frame including a point of attachment to the rod. A garnish covers at least a portion of the frame and includes a passage through which the rod extends. A cover having a cupped body fills the passage and includes a hole through which the rod extends.

20 Claims, 4 Drawing Sheets

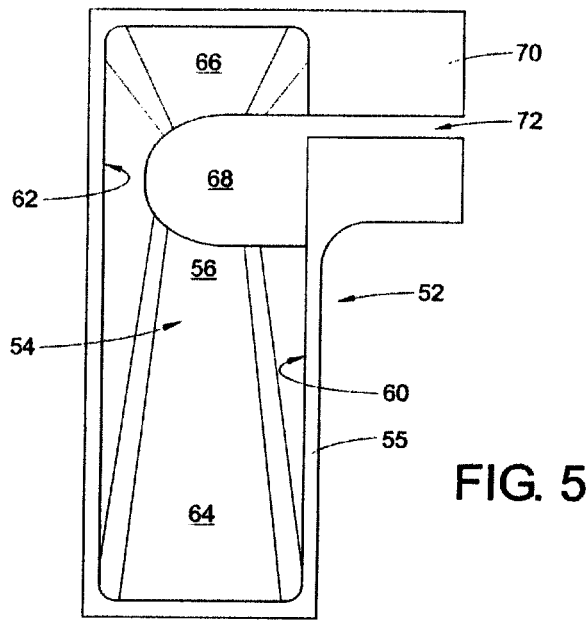
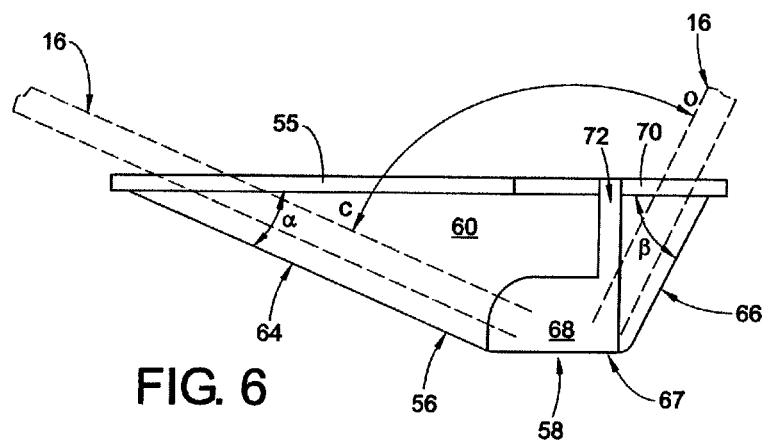

COVER FOR A TAILGATE ROD PASSAGE

BACKGROUND

The present disclosure relates generally to a cover or a tailgate rod passage in the tailgate assembly of an automotive vehicle.

The advantages of providing a vehicle, such as a van or sport utility, with a tailgate for cargo access have been recognized for many years. Moreover, these vehicles provide rear storage compartments which can be accessed to receive large items via a lift-gate that opens substantially the entire rear of the vehicle.

A lift-gate that swings upward about a horizontal axis to open can require significant lifting force to effect opening. For the convenience of the person using a vehicle having a lift type tailgate, it may be desired that a power lift system be provided to reduce the required lifting effort, particularly where the tailgate is a heavy singular gate or door that closes the entire rear access opening. Similarly, it may be desirable to provide a fully automated lift type tailgate assembly.

Various forms of power lift-gate systems have been proposed. Typically, they include a motor conditioned to drive a rod which is connected to the tailgate. More particularly, the lift type tailgate is connected to a motor provided in a vehicle compartment with a connection rod, and opening/closing of the tailgate is assisted and/or automatically driven by the motor. The motor can be located on an interior surface of a rear pillar and covered by a pillar garnish adapted to cover the surface of the rear pillar. The connection rod projects from the motor rearwardly via an opening formed in the pillar garnish and attaches to the tailgate so as to move generally diagonally upwardly and downwardly. Typically, the connection is made between a socket portion of the connection rod and a post secured to the tailgate. In this manner, a rotatable connection is formed to allow a change in orientation throughout the opening-closing process. In various commercial embodiments, the socket-to-post connection may be exposed or may be formed under a garnish. Traditionally, a rubber skirt may be provided to fill the opening in the garnish while allowing passage of the connection rod.

SUMMARY OF THE DISCLOSURE

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to one embodiment, a cover for a passage in a garnish through which a tailgate rod passes is disclosed. The cover is comprised of a body having a perimeter shaped to cooperatively fill the passage. The perimeter further defines a cupped region including opposed side walls, a first inwardly inclined end wall having a slope, and a second inwardly inclined end wall having a slope greater than the first end wall. An opening is provided in the body proximate a base region thereof.

According to a further embodiment, a tailgate for an automotive vehicle is disclosed. The tailgate is coupled by a rod to a motor within the automotive vehicle to open and close the tailgate. The tailgate includes a metal frame having a point of attachment to the rod. A garnish covers at least a portion of the frame and includes a passage through which the rod extends. A cover having a cupped body including a hole through which the rod or the point of attachment extends fills the passage.

According to a third embodiment, a tailgate for an automotive vehicle is provided. The tailgate is coupled via a rod to a motor provided within the vehicle to open and close the tailgate. The tailgate includes a point of attachment to the rod with a cover overlapping the point of connection. The cover includes a passage disposed within a recessed cavity.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 5 is a perspective view of the cover; and

FIG. 6 is a side elevation view of the cover.

DETAILED DESCRIPTION

Figure 1:
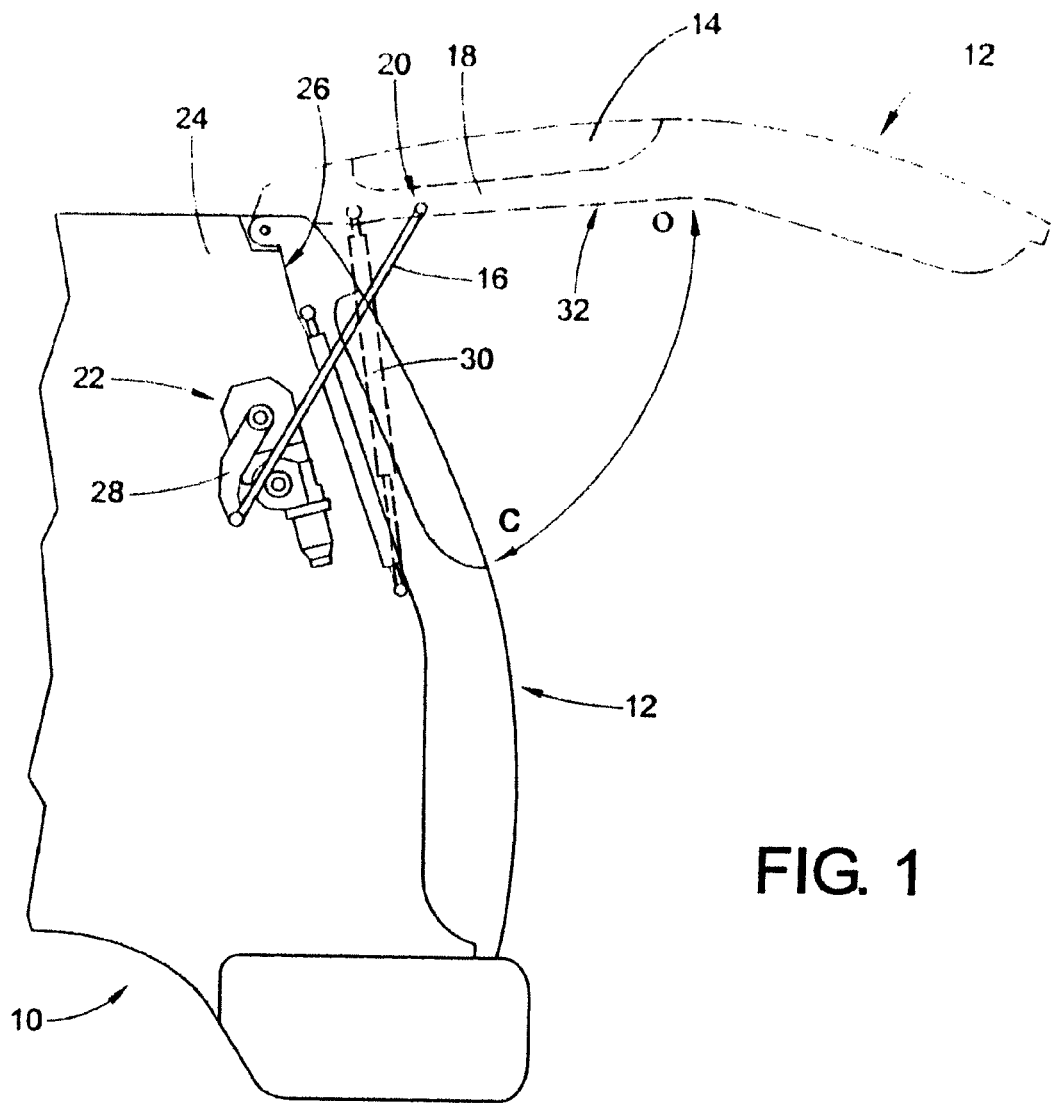
FIG. 1 is a side view (partially in phantom) of a rear tailgate assembly of an automotive vehicle.

One or more embodiments or implementations are hereinafter described in conjunction with the drawings, where like reference numerals are used to refer to like elements throughout, and where the various features are not necessarily drawn to scale.

Figure 2:
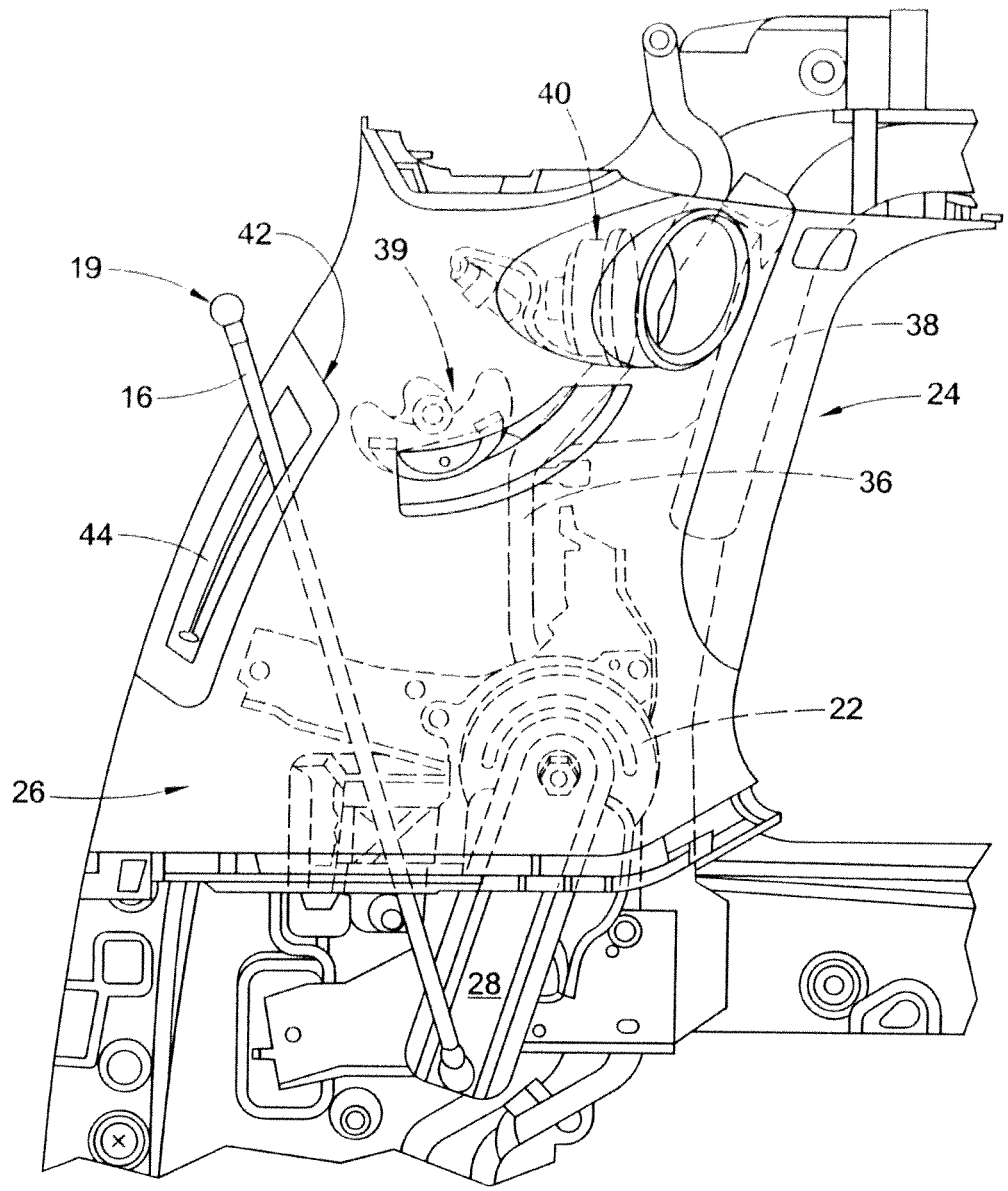
FIG. 2 is a side view of a rear pillar including a superimposed garnish applied thereto.
Figure 3:
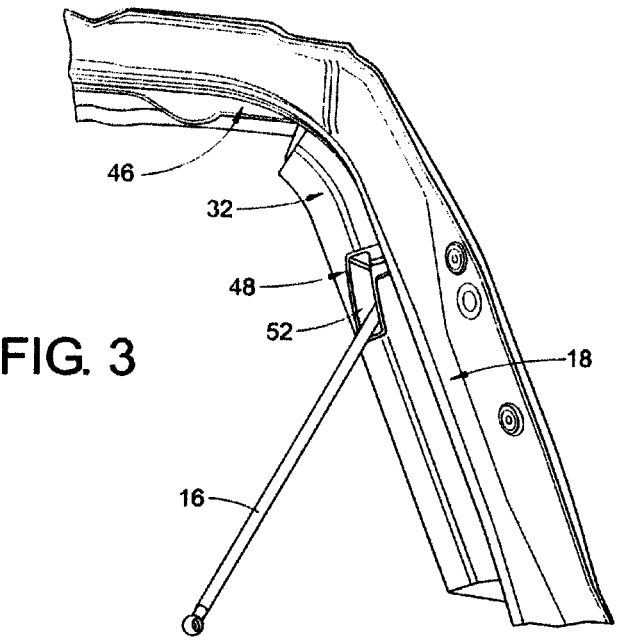
FIG. 3 is a perspective view of the power tailgate rod assembly.
Figure 4:
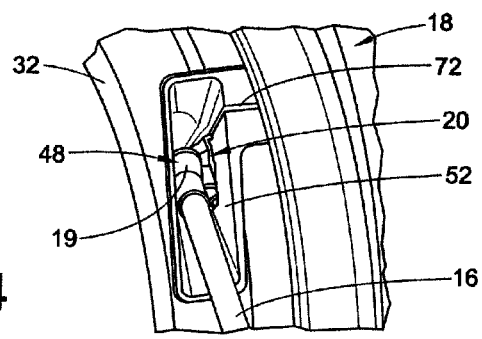
FIG. 4 is a side elevation detailed view of the tailgate rod mated to the tailgate.

Referring now to FIGS. 1 and 2, the general design of a powered tailgate assembly of an automotive vehicle 10 is depicted. To facilitate understanding of this disclosure, FIG. 1 includes a first closed tailgate 12 embodiment shown in solid line and a second superimposed open tailgate 12 embodiment shown in dashed line. The tailgate 12 is rotatable between a closed and an open position demonstrated by arcuate line "C-O".

Tailgate 12 is comprised of a metal body surrounding a window opening 14. A connection rod 16 is secured to an inner peripheral surface of the door frame 18. More particularly, the connection rod 16 is secured to a post 20 mounted to the inner peripheral surface of the door frame 18 via a ball socket 19 on the projecting end thereof.

A motor 22 is secured to an interior surface of a rear pillar 24 and is concealed within a pillar garnish 26. Projecting end refers to the region of the connection rod extending outside of garnish 26 The connection rod 16 is secured to an end of a turn arm 28 which is driven by motor 22 so as to extend selectively and generally forward and backward (based on the vehicle orientation).

The connection rod 16 is oriented such that when the motor 22 is driven, the turn arm 28 moves the connection rod 16 rearward and diagonally upwards (opening the tailgate 12) or forward and diagonally downwards (closing the tailgate 12). A gas damper 30 is further supplied to support the tailgate 12 in the open position.

The drive assembly of the powered tailgate includes the rear pillar 24 which accommodates multiple components including, power tailgate motor 22, power tailgate rod 16, seat belt D-ring 34, electrical wire harness 36, a side curtain air bag 38 and a speaker 40. Rear pillar garnish 26 is superimposed over the rear pillar 24. The rear pillar garnish 26 attaches to the rear pillar 24 thereby providing a protective cover for the above mentioned components, including the power tailgate motor 22. The rear pillar garnish 26 includes a rectangular shaped opening 42 which receives a cover 44. Cover 44 allows connection rod 16 (including the projecting portion terminating in ball socket 19) to pass through the rear pillar garnish 26.

Ball socket 19 of connection rod 16 is secured to the post 20 on the door frame 18. The inner peripheral surface of the door frame 18 is covered with a door garnish 32. The door garnish 32 extends along the inner peripheral surface and covers both at least a portion of the inner peripheral surface of the door frame 18 and the post 20. Multiple cooperative garnish elements will typically be employed to cover the entirety of the door frame. The door garnish 32 includes an opening suitable for accommodating passage of connection rod 16 in a location corresponding to the post 20. A cover member used to fill this opening is described in greater detail below with respect to FIGS. 3-6.

Referring now to FIGS. 3-6, tailgate garnish 32 is attached to a surface of the door frame 18. More particularly, the tailgate garnish 32 is attached to and conceals the inner peripheral surface 46 of the door frame 18, and overlaps a connection post 20 secured to the door frame 18. The tailgate garnish 32 provides a through hole 48 for receiving the connection rod 16. The ball socket 19 is provided at a projecting end of the connection rod 16 and is fitted to the post 20 so as to permit the joint to rotate upwardly and downwardly. A cover 52 fills through hole 48 and receives connection rod 16 which passes therethrough.

Cover 52 is generally comprised of an elongated body 54 having a rim 55 defining a cup shaped body 56 extending therefrom. Cup shaped body 56 can be in the general shape of a truncated cone 58, formed by side walls 60 and 62 and inwardly inclined end walls 64 and 66 and a base region 67. The base region 67 can be formed as a separate wall that intersects side walls 60 and 62 and end walls 64 and 66 o may be formed at the point where side walls 60 and 62 and end walls 64 and 66 intersect. Side walls 60 and 62 can be perpendicular to the plane of rim 55 and reside in generally parallel planes or may be slightly inwardly inclined. To provide a sufficient range of motion for connection rod 16, inclined wall 64 is provided with a relatively shallow slope as compared to inclined wall 66. Moreover, angle $\alpha$ is less than angle $\beta$. In this manner, a relatively extensive range of inclination is available for connection rod 16 during its travel between tailgate closed and tailgate open positions. This is depicted by the phantom lines for connection rod 16 in FIG. 6.

Truncated base 58 includes a passage 68. Passage 68 can also extend into side wall 60 to facilitate passage of connection rod 16 and/or entry of connection post 20. In this regard, it is contemplated that connection rod 16 may pass through cover 52 to mate with the post on inner peripheral surface 46 of door frame 18 or that post 20 may penetrate cover 52 to allow mating with the ball socket 19 of connection rod 16 within the cup shaped body 56.

A planar wall 70 extends from rim 55 to provide increased structural integrity to the cover 52. A gap 72 extends in each of planar wall 70 and side wall 60 and intersects passage 68 to allow the cover to be installed over an installed connection rod 16.

The cover 52 is received in through hole 48 via an interference fit, but could also be retained via a mechanical joinder (such as clips or screws) or adhesively. It can be formed, for example, a polymeric material selected from an olefinic polymer such as polyethylene or polypropylene, an engineered resin such as polycarbonate or an elastomeric polymer such as styrene-butadiene copolymer. In addition, it is noted that the disclosure contemplates forming the cover element as an integral component of the tailgate garnish.

In accordance with the present embodiment, the connection rod is connected to the door frame in the space provided by the cover so that the connection area is not overtly exposed to the vehicle compartment. This provides improved aesthetics. The depicted cover provides an improved appearance to the passage for the tailgate rod in the tailgate garnish. The design also minimizes the accessibility (visually and physically) to the internal mechanisms. Nonetheless, the passage provided in the cover also allows a full range of motion for the rod during tailgate stroke.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

We claim:

1. A cover for a passage in a garnish through which a tailgate rod passes comprising a body having a perimeter edge shaped to cooperatively fill said passage, said perimeter edge further defining a cupped region including opposed side walls, a first inwardly inclined end wall having a slope, a second end wall having a slope greater than said first end wall, said first and second end walls extending from said perimeter edge and defining an opening in said body proximate a base region, said opening positioned distal to a plane in which said perimeter edge resides and further penetrating at least one side wall.

2. The cover of claim 1 wherein said first inwardly inclined wall has a length greater than a length of said second inwardly inclined wall.

3. The cover of claim 1 further including a gap in one of said walls extending from the perimeter edge and intersecting said opening.

4. The cover of claim 3 further comprising a substantially planar projection extending tangential to one of said side walls.

5. The cover of claim 4 wherein said gap extends through said planar projection to an edge thereof.

6. The cover of claim 1 being comprised of a polymeric material.

7. The cover of claim 1 wherein said opposed side walls reside in generally parallel planes.

8. The cover of claim 1 wherein said second end wall is inwardly inclined.

9. The cover of claim 1 wherein said slope of said first end wall is substantially constant between said perimeter edge and said opening.

10. The cover of claim 1 wherein said opening resides in a plane on an opposite side of the cover relative to the plane in which said perimeter edge resides.

11. A tailgate for an associated automotive vehicle, said tailgate coupled via a rod to a motor provided within said associated automotive vehicle to open and close the tailgate, the tailgate comprising a metal frame including a point of attachment to said rod, a garnish covering at least a portion of said frame, said garnish including a passage through which said rod extends, a cover having a cupped body filling said passage, said cover further including a hole through which one of said rod and said point of attachment extends and a gap extending through the entirety of a side wall of said body and intersecting said passage.

12. The tailgate of claim 11 wherein said point of attachment comprises a post.

13. The tailgate of claim 11 wherein a mouth of said body faces away from said metal frame.

14. The tailgate of claim 11 wherein said cover includes a further laterally extending wall, said gap dissecting said wall.

15. A tailgate for an associated automotive vehicle, said tailgate coupled via a rod to a motor provided within said associated automotive vehicle to open and close the tailgate, the tailgate including a point of attachment to said rod, a cover overlapping said point of connection, said cover defining a recessed cavity having first and second end walls and first and second side walls, the first end wall having a slope greater than a slope of said second end wall, and a passage being formed in the recessed cavity, said cover further including a gap in one of the walls and intersecting said passage.

16. The tailgate of claim 15 wherein said recessed cavity is in the shape of a truncated cone.

17. The tailgate of claim 15 wherein said point of connection comprises a post extending through said passage and into said cavity.

18. The tailgate of claim 15 wherein said first and second end walls intersect a base wall.

19. The tailgate of claim 15 wherein said cover is integrally formed with a tailgate garnish.

20. The tailgate of claim 19 wherein said garnish includes a gap extending from an edge and intersecting said passage such that said garnish can be mounted to said tailgate with said rod secured at a first end to a turn arm and at a second end to said point of connection.

* * * * *